J. A. GUTRIDGE AND J. A. WOOD.
ROAD DRAG.
APPLICATION FILED JUNE 30, 1921.
1,434,287.
Patented Oct. 31, 1922.
2 SHEETS—SHEET 2.
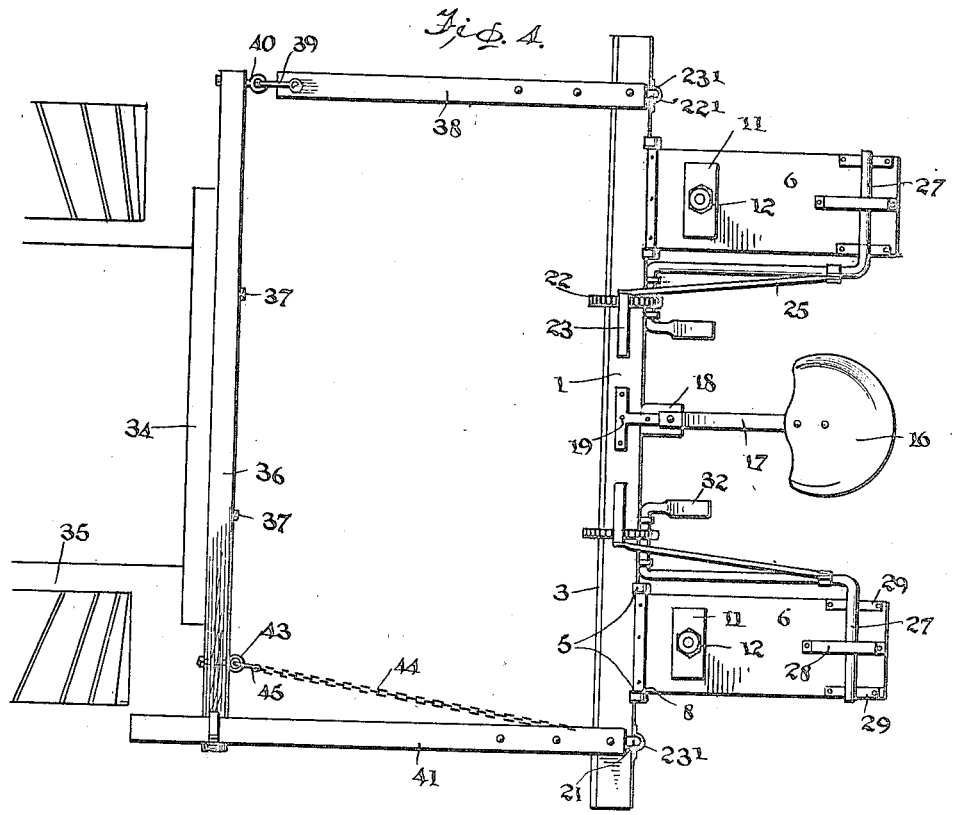
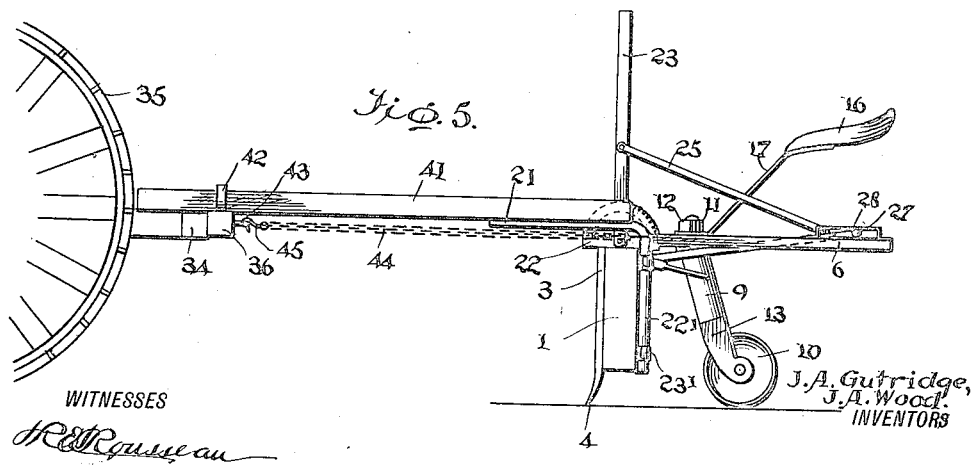
WITNESSES
J. A. Gutridge,
J. A. Wood,
INVENTORS
BY
ATTORNEYS Patented Oct. 31, 1922.

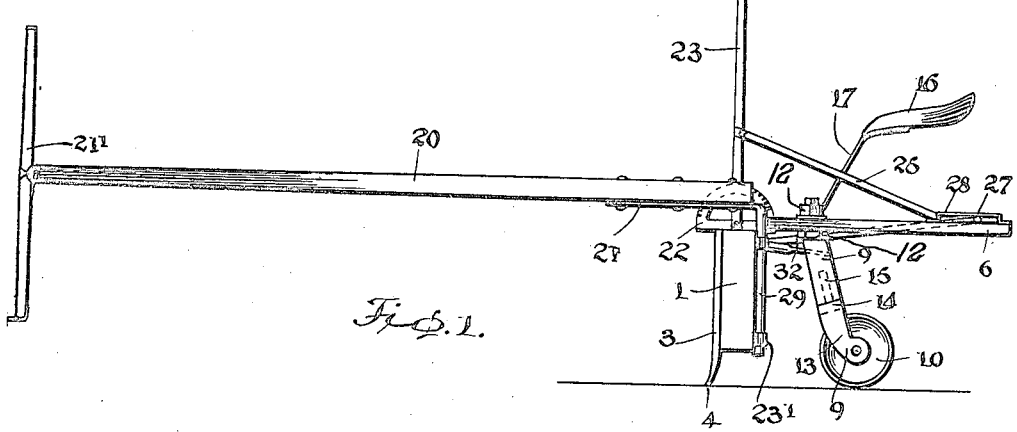
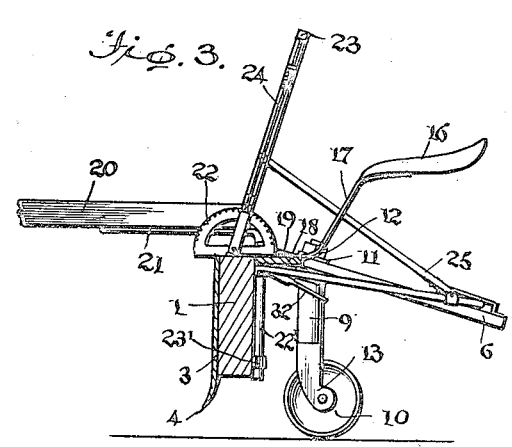
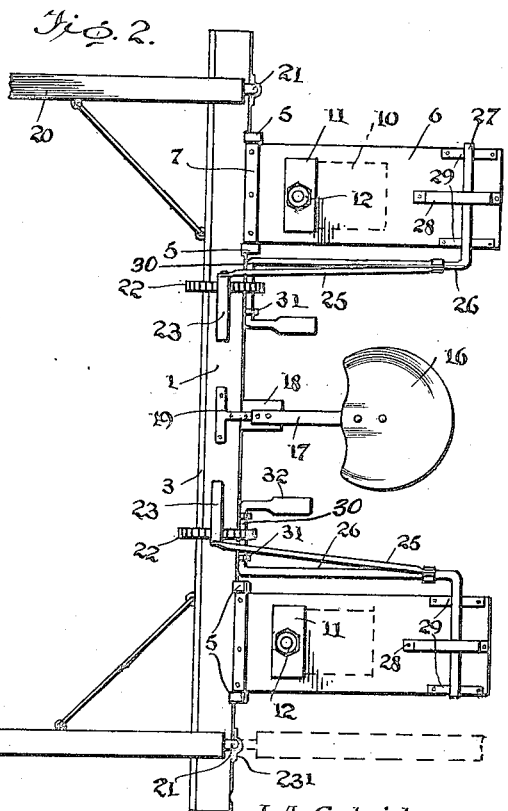

1,434,287

UNITED STATES PATENT OFFICE.

JOHN A. GUTRIDGE AND JAMES A. WOOD, OF McLOUD, OKLAHOMA.

ROAD DRAG.

Application filed June 30, 1921. Serial No. 481,718.

*To all whom it may concern:*

Be it known that we, JOHN A. GUTRIDGE and JAMES A. WOOD, citizens of the United States, and residents of McLoud, in the county of Pottawatomie and State of Oklahoma, have invented certain new and useful Improvements in Road Drags, of which the following is a specification.

Our invention is an improvement in road drags, and has for its object to provide an implement of the character specified of simple and inexpensive construction, for grading and rounding up smoothly roadways, wherein a scraper plate is provided, having means at its ends for connection with draft animals to travel before and behind the plate, the said plate having means for permitting either or both ends to be lifted.

Another object of the invention is to provide improved means as compared to that shown in our prior application filed April 21, 1920, now Patent No. 1,394,548, Oct. 25, 1921, for the purpose of lifting the drag from the ground at either or both ends, that is the scraping edge thereof either by hand or foot and with less exertion of force or power by the operator so as to require but a single operator to drive the team or teams, as well as to provide improved means for bracing the draft poles or tongues in front of the machine.

A further object is to provide improved means for advancing the device by means of draft animals or a tractor, the invention therefore embodying novel and simple means for coupling the device to the draw bar of a tractor and for adjusting the angular position of the drag obliquely across the road, in a simple and novel manner.

Other objects and advantages of our invention will become readily apparent to persons skilled in the art, from a consideration of the following description when taken in conjunction with the accompanying drawings wherein:

Figure 1 is a side view of the improved drag.

Figure 2 is a plan view thereof.

Figure 3 is a longitudinal sectional view corresponding to Figures 1 and 2 in which provision is made for advancing the device by draft animals and showing the manner of lifting the drag and more particularly the cutting edge thereof below the beam together with the latter.

Figure 4 is a plan view showing the device coupled to the tractor draw bar, and

Figure 5 is a side elevation of the device shown in Figure 4.

Referring to the drawings in detail, in which like reference characters designate corresponding parts throughout the several views and referring more particularly to Figures 1 to 3 inclusive, a scraper is provided consisting of a beam 1 of suitable length and cross section and of iron or wood or the like having secured to the forward face thereof when produced of wood, a plate 3 of metal the said plate extending below the beam, as shown, and having the edge sharpened and curved forwardly to form a cutting edge 4.

Near each end of the beam and on its rear face, there is secured a pair of vertical pivot arms or bearings 5 and between these arms or brackets there is pivoted a lever or board 6, each of which is relatively wide and is provided at its forward edge with a plate 7 having trunnions 8 at the ends thereof for engaging the bearings or arms 5 at the sleeve or globular pivot socket at the upper ends thereof, thus allowing the levers to swing in a vertical plane on the horizontal pivot thus produced.

Each of these levers or boards carries near its pivoted end a standard 9, and a pivoted castor wheel 10 is connected with the standard as indicated, each wheel being relatively broad so as to prevent the same from sticking in soft ground, especially when lifting the device. For this purpose, a plate 11 is mounted on each lever or board and receives the standard and holds the same against displacement through the medium of lock nuts 12 above and below the lever or board.

Each wheel is journaled between the arms 13 of the forks of the castor wheel standards whose body 14 has a pin 15 forming the shank of the fork, extending into an axial opening in the standard, the arrangement being such that the wheel is free to swing about the standard. The arms 13 of the yoke curve rearwardly and by pressing on the rear of the lever or board, the adjacent end of the scraper may be lifted to vary the depth of the cut, or to prevent its cutting.

A seat 16 is connected and mounted centrally to and upon the beam by means of the supporting arm or shank 17 forming a standard therefor, the beam having a rearwardly projecting arm 18 for this purpose and a brace 19 reinforcing and supporting the same in position. Tongues 20 are connected to the ends of the beam 1, an angle rod 21 being secured to one end of each tongue and each rod having a portion secured to the tongue and a portion extending perpendicularly to the tongue to produce depending portions 22' which are journaled in bearings 23' on the rear of the beam. The tongues are provided with suitable whiffletree or other draft attaching means for animals, in order that the tongues may be disposed forwardly or rearwardly, that is both forwardly or both rearwardly, or one forwardly and the other rearwardly or vice versa, the draft animals connected to the whiffletrees 21 so as to pull in opposite directions, in the same direction or one pushing and the other pulling. It will be obvious that either tongue might be swung into the opposite direction from that shown in Figure 2, that is in the manner above explained, in order that the device may be properly controlled and held at the required angle. It will also be seen from Figure 1 of the drawings that two bearings 23' are provided for the tongue, one at the top of the beam and one near the bottom of the beam.

In order to conveniently operate the lifting devices constituted by the boards or levers and the castor or gauge wheels extending therefrom or from the seat 16 by a single operator who can also drive the teams, there is mounted upon opposite sides of the seat standard upon the beam, notched segments 22 in which are pivotally mounted levers 23 each having a ratchet lever 24 constituting means for holding the levers in adjusted position with the handle ends thereof extending inwardly in opposite directions toward each other for manipulation by the operator reposed on the seat 16. The levers 23 are connected by links or rods 25 intermediately of the ends thereof, to foot levers 26 which foot levers are of right angular formation and having outwardly directed portions 27 slidably connected to the levers or boards 6 near the rear ends of the latter. For this purpose, guide strips 28 are mounted centrally upon the boards or levers and receive the outwardly directed portions beneath the same and upon the wear plates 29 mounted at opposite edges of said levers or boards. The crank portions 30 of the foot levers are journaled or pivoted to the rear face of the beam as indicated at 31 and the inner ends of the levers are extended rearwardly to provide foot engaging portions or pedals 32 disposed in parallel relation and in horizontal alignment or in the same horizontal plane with the remaining portions so that by pressing downwardly upon said tread portion 32 the outwardly directed portions 27 will be caused to slide upon the levers 6 thus forcing the same downwardly together with the castor or gauge wheels and thereby lifting the cutting edge of the beam. By releasing the foot levers, which as clearly shown in Figure 2 of the drawings form convenient means for supporting the feet of the operator or driver, the outwardly directed portions 27 will move forwardly beneath the guides or straps 28 and permit the beam to be lowered so the cutting or scraping edge thereof will engage the ground. Obviously, the levers 23 may be actuated together with or in lieu of the foot levers so that the device may be operated by hand, said hand levers being operated simultaneously at both sides so as to raise the entire beam, or independently in order to raise one side while retaining the other in contact with the ground. It will also be apparent that the weight of the driver or operator will tend to balance the weight of the tongues when both are disposed in front and is primarily the purpose thereof, while dragging, said tongues being provided with braces 33 to the beams for the purpose.

In operation, preferably two beams will be used, although the device may readily accommodate three draft animals. By means of the foot or hand levers, or both, the extent of the cutting of the blade may be varied, and just the proper amount may be cut. By inclining the beam, the soil may be moved inwardly or outwardly, as may be desired. When the outer end of the beam is in advance, the soil will be moved inwardly. By holding the lower edge of the blade at the grade desired, all portions above the grade may be cut off and those below filled up. By raising the drag with a load, the load may be dumped, to be left in holes. Also by means of the levers, the blades may be lifted while passing over bridges, railroads or the like.

In order to provide means for hitching or coupling the device to a tractor, the construction shown in Figures 4 and 5 is employed. In this form, the draw bar 34 of the tractor 35 is equipped with a beam 36 running transversely and bolted to the draw bar at suitable points as indicated at 37. The beam 36 of the tractor has a short tongue 38 connected thereto by means of a clevis 39 and an eye-bolt 40, the bolt 40 being secured to the beam 36. A longer tongue 41 is connected to the opposite end of the beam, the connections of the tongues 38 and 41 with the beam of the draw bar being the same as that heretofore described. The tongue 41 is adapted to slide through a ring or guide 42 carried by the end of the beam 36 remote to the end to which the tongue 38 is connected, the tongue 41 being adapted to freely or loosely slide through said ring or guide. A chain 44 has one end provided with a hook 45 connected to an eye bolt 43 carried by the beam 36. The chain 44 is also connected to the tongue 41 and serves to hold the beam 3 in the proper position. Obviously, the chain 44 may be extended through the eye of the bolt 43 and the hook 45 connected to any of the links of the chain so as to vary its angular position, the pivotal connection of the tongue 38 with the clevis 39 permitting such disposition of the drag. This construction provides an efficient coupling or hitching means for connecting the drag to the tractor in lieu of the draft animals by the hitching means heretofore described.

In view of the foregoing it is thought that the operation of the device will be readily understood and in view of the simplicity and practical value that it will readily commend itself to those skilled in the art.

Having thus described our invention what we claim is:—

1. A road drag comprising a beam, a blade carried thereby, a pair of boards horizontally pivoted at their forward ends to the rear side of said beam, a seat carried by said beam between said boards, standards connected to said boards and having ground contact wheels, lifting rods rotatably connected intermediate their ends to said beam and having rearwardly directed arms provided with laterally directed terminal portions mounted on said boards, guide strips connecting the arms to said boards and limiting the movement of the arms with relation to said board said rods being provided with rearwardly directed foot pedals by means of which the boards may be elevated, levers pivoted to said beam and links connecting said levers and said rearwardly directed arms.

2. A road drag comprising a beam, a blade carried thereby, a pair of boards horizontally pivoted at their forward ends to the rear side of said beam, a seat carried by said beam between said boards, standards connected to said boards and having ground contact wheels, lifting rods rotatably connected intermediate their ends to said beam and having rearwardly directed arms provided with laterally directed terminal portions mounted on said boards, guide strips connecting the arms to said boards and limiting the movement of the arms with relation to said board said rods being provided with rearwardly directed foot pedals by means of which the boards may be elevated, levers pivoted to said beam and links connecting said levers and said rearwardly directed arms, and means associated with said levers and within convenient reach of the operator for causing the boards to be held in an adjusted position.

JOHN A. GUTRIDGE.
JAMES A. WOOD.